(12) United States Patent
Adragna et al.

(10) Patent No.: US 9,126,518 B2
(45) Date of Patent: Sep. 8, 2015

(54) VEHICLE SEAT FRAME AND METHOD OF MAKING

(75) Inventors: Vincent Adragna, New Hudson, MI (US); Michael Powell, Waterford, MI (US); Karl Henn, New Hudson, MI (US); David J. Abdella, Royal Oak, MI (US)

(73) Assignee: Lear Corporation, Southfield, MI (US)

( * ) Notice: Subject to any disclaimer, the term of this patent is extended or adjusted under 35 U.S.C. 154(b) by 258 days.

(21) Appl. No.: 13/058,131

(22) PCT Filed: Aug. 29, 2008

(86) PCT No.: PCT/US2008/074722
§ 371 (c)(1),
(2), (4) Date: Feb. 8, 2011

(87) PCT Pub. No.: WO2010/024817
PCT Pub. Date: Mar. 4, 2010

(65) Prior Publication Data
US 2011/0133538 A1    Jun. 9, 2011

(51) Int. Cl.
*B60N 2/44*    (2006.01)
*B60N 2/68*    (2006.01)
*B60N 2/16*    (2006.01)
*B60N 2/18*    (2006.01)

(52) U.S. Cl.
CPC .............. *B60N 2/682* (2013.01); *B60N 2/1615* (2013.01); *B60N 2/1803* (2013.01); *Y10T 156/10* (2015.01)

(58) Field of Classification Search
CPC ........ B60N 2/1803; B60N 2/68; B60N 2/682; B60N 2/1615; B60N 2/165

USPC .............. 297/452.18, 452.15, 440.2, 440.21, 297/452.2

See application file for complete search history.

(56) References Cited

U.S. PATENT DOCUMENTS 3,586,376 A * 6/1971 Le Mire ...................... 297/452.2
3,612,607 A   10/1971 Lohr et al.
4,500,136 A    2/1985 Murphy et al.
4,631,797 A * 12/1986 Hill ................................ 29/447

(Continued)

FOREIGN PATENT DOCUMENTS

CN           1819787 A     8/2006
CN       101070057 A     11/2007

(Continued)

OTHER PUBLICATIONS

Chinese Fourth Office Action, Application No. 200880130861.4 dated Jan. 4, 2015.

(Continued)

*Primary Examiner* — Rodney B White
*Assistant Examiner* — Richard Lowry
(74) *Attorney, Agent, or Firm* — MacMillan, Sobanski & Todd, LLC

(57) ABSTRACT

A vehicle seat frame (10) includes a plurality of frame components (16, 40, 42, 50, 60, 62, 64). At least one of the frame components (16, 40, 42, 50, 60, 62, 64) is fixedly connected to another of the frame components (16, 40, 42, 50, 60, 62, 64), defining a fixed joint (84, 86, 88, 90). In each fixed joint (84, 86, 88, 90), one of the frame components (16, 40, 42, 50, 60, 62, 64) is connected to another of the frame components (16, 40, 42, 50, 60, 62, 64) only by at least one of structural adhesive, a fastener (72, 74), and a fixed swaged joint (76).

9 Claims, 4 Drawing Sheets

(56) References Cited

U.S. PATENT DOCUMENTS

| | | | |
|---|---|---|---|
| 4,872,551 A | 10/1989 | Theros | |
| 5,240,310 A * | 8/1993 | Rink | 297/452.18 |
| 5,498,051 A | 3/1996 | Sponsler et al. | |
| 5,498,096 A * | 3/1996 | Johnson | 403/267 |
| 5,522,640 A * | 6/1996 | Bilezikjian | 297/216.2 |
| 5,636,901 A * | 6/1997 | Grilliot et al. | 297/452.18 |
| 5,671,976 A * | 9/1997 | Fredrick | 297/452.18 |
| 5,729,463 A | 3/1998 | Koenig et al. | |
| 5,749,135 A * | 5/1998 | Crane et al. | 29/415 |
| 5,769,499 A * | 6/1998 | Dudash et al. | 297/452.18 |
| 5,795,024 A * | 8/1998 | Collins et al. | 297/452.18 X |
| 5,860,780 A * | 1/1999 | Lenac et al. | 411/501 |
| 6,007,154 A * | 12/1999 | Parker et al. | 297/410 |
| 6,035,516 A * | 3/2000 | Petersen | 29/523 |
| 6,227,595 B1 | 5/2001 | Hamelin et al. | |
| 6,260,924 B1 * | 7/2001 | Jones et al. | 297/452.18 |
| 6,361,115 B1 * | 3/2002 | Aufrere et al. | 297/452.18 |
| 6,502,799 B2 * | 1/2003 | Lepaule | 248/423 |
| 6,572,196 B1 * | 6/2003 | Thieme et al. | 297/452.18 |
| 6,739,673 B2 | 5/2004 | Gupta et al. | |
| 6,922,882 B2 | 8/2005 | Shah et al. | |
| 7,066,552 B2 * | 6/2006 | Yoshida | 297/452.18 |
| 7,097,742 B2 | 8/2006 | Furuse | |
| 7,140,589 B2 * | 11/2006 | Woodard et al. | 248/421 |
| 7,172,251 B2 | 2/2007 | Takata et al. | |
| 7,213,887 B2 * | 5/2007 | Dudash et al. | 297/452.18 |
| 7,250,091 B2 * | 7/2007 | Gupta et al. | 156/242 |
| 7,281,766 B2 | 10/2007 | Fujita et al. | |
| 7,316,454 B2 * | 1/2008 | Yoshida | 297/344.14 |
| 7,331,634 B2 | 2/2008 | Petersen | |
| 7,513,571 B2 * | 4/2009 | Hofmann et al. | 297/344.15 |
| 7,731,292 B2 * | 6/2010 | Ishijima et al. | 297/452.18 |
| 8,172,326 B2 * | 5/2012 | Adragna et al. | 297/344.17 |
| 8,408,654 B2 * | 4/2013 | Jones et al. | 297/452.18 |
| 8,733,842 B2 * | 5/2014 | Sakkinen et al. | 297/452.18 |
| 2005/0035641 A1 * | 2/2005 | Petersen | 297/396 |
| 2007/0194613 A1 * | 8/2007 | Kojima | 297/344.15 |
| 2009/0230752 A1 * | 9/2009 | Adragna et al. | 297/463.1 |
| 2010/0171356 A1 * | 7/2010 | Gross et al. | 297/452.18 |
| 2010/0194170 A1 | 8/2010 | Muhlenbrock | |
| 2012/0169107 A1 * | 7/2012 | Sakkinen et al. | 297/452.18 |

FOREIGN PATENT DOCUMENTS

| | | |
|---|---|---|
| DE | 10329017 A1 | 1/2005 |
| DE | 202005001773 U1 | 6/2006 |
| DE | 102007052960 A1 | 5/2009 |
| EP | 1854658 B1 | 7/2012 |
| FR | 2772317 * | 6/1999 |
| FR | 2772317 A1 | 6/1999 |
| JP | 2007-176222 * | 7/2007 |
| JP | 2008087558 A | 4/2008 |
| WO | 2006050595 A1 | 5/2006 |

OTHER PUBLICATIONS

"Chinese Search Report", Application No. 2008801308614, dated Aug. 29, 2008.

"German Office Action", Application No. 11 2008 004 000.1, dated Mar. 4, 2013.

* cited by examiner

VEHICLE SEAT FRAME AND METHOD OF MAKING

BACKGROUND

Various embodiments of a vehicle seat frame are described herein. In particular, the embodiments described herein relate to an improved vehicle seat frame and an improved method for manufacturing a vehicle seat frame.

Vehicle seat frames typically include a seat back mounted on a seat cushion or bottom. The seat back is pivotally mounted on the seat bottom for adjusting the seat back at a desired inclined angle relative to the seat bottom. The seat bottom is commonly mounted on the floor of the vehicle such that the position of the seat relative to the floor can be adjusted. Typically, some components of the seat frame are formed from steel and other metals and at least some of the components are fixedly connected to one another by welding.

One example of known methods of assembling a vehicle seat structure using combinations of welding and threaded fasteners is disclosed in U.S. Pat. No. 7,281,766.

It is also know to fixedly connect vehicle components with fasteners supplemented by structural adhesive. A vehicle door formed by such a method is disclosed in U.S. Pat. No. 7,097,742, wherein structural adhesive is used in combination with rivets to bond two or more vehicle door components together.

U.S. Pat. No. 6,922,882 discloses also discloses using structural adhesive to provide additional strength to a welded joint between two tubular members.

U.S. Pat. No. 6,035,516 discloses using swaging to secure or fixedly connect a head rest support into a vehicle seat frame for which welding is used in the seat frame assembly process.

U.S. Pat. No. 7,250,091 discloses a method of forming a seating system wherein elongated ribs 60 in a first panel are disposed within corresponding channels 56 in a second panel. Adhesive 66 is further provided between the panels.

Outside of the seat frame assembly industry, it is also known to form a non-pivoting connection between a tube and a flat plate or member by means of swaging two portions of the tube to form radially outwardly extending beads, thereby trapping the bracket therebetween. Such a method is described in U.S. Pat. No. 6,823,575. Although this method may provide adequate support such that the plate is generally prevented from undesirable axial movement, this known method of swaging does not permit a pivoting connection between the tube and the plate.

U.S. patent application Ser. No. 12/075,946, incorporated herein by reference in its entirety, discloses a using a swaging process to define a pivot joint in a vehicle seat frame.

SUMMARY

The present application describes various embodiments of a vehicle seat frame. In one embodiment, the vehicle seat frame includes a plurality of frame components.

A vehicle seat frame includes a plurality of frame components. At least one of the frame components is fixedly connected to another of the frame components, defining a fixed joint. In each fixed joint, one of the frame components is connected to another of the frame components only by at least one of structural adhesive, a fastener, and a fixed swaged joint.

In another embodiment, the vehicle seat frame includes a plurality of frame components. At least one of the frame components is one of fixedly connected and pivotally connected to another of the frame components, defining at least one of a fixed joint and a pivot joint, respectively. In each fixed joint, one of the frame components is connected to another of the frame components by only at least one of structural adhesive, a fastener, and a fixed swaged joint.

An additional embodiment includes a method of forming a vehicle seat frame. The method includes providing a plurality of frame components. One of the frame components is then fixedly connected to another of the frame components only by at least one of structural adhesive, a fastener, and a fixed swaged joint, thereby defining a fixed joint.

Other advantages of the vehicle seat frame will become apparent to those skilled in the art from the following detailed description, when read in light of the accompanying drawings.

DETAILED DESCRIPTION

Figure 1:
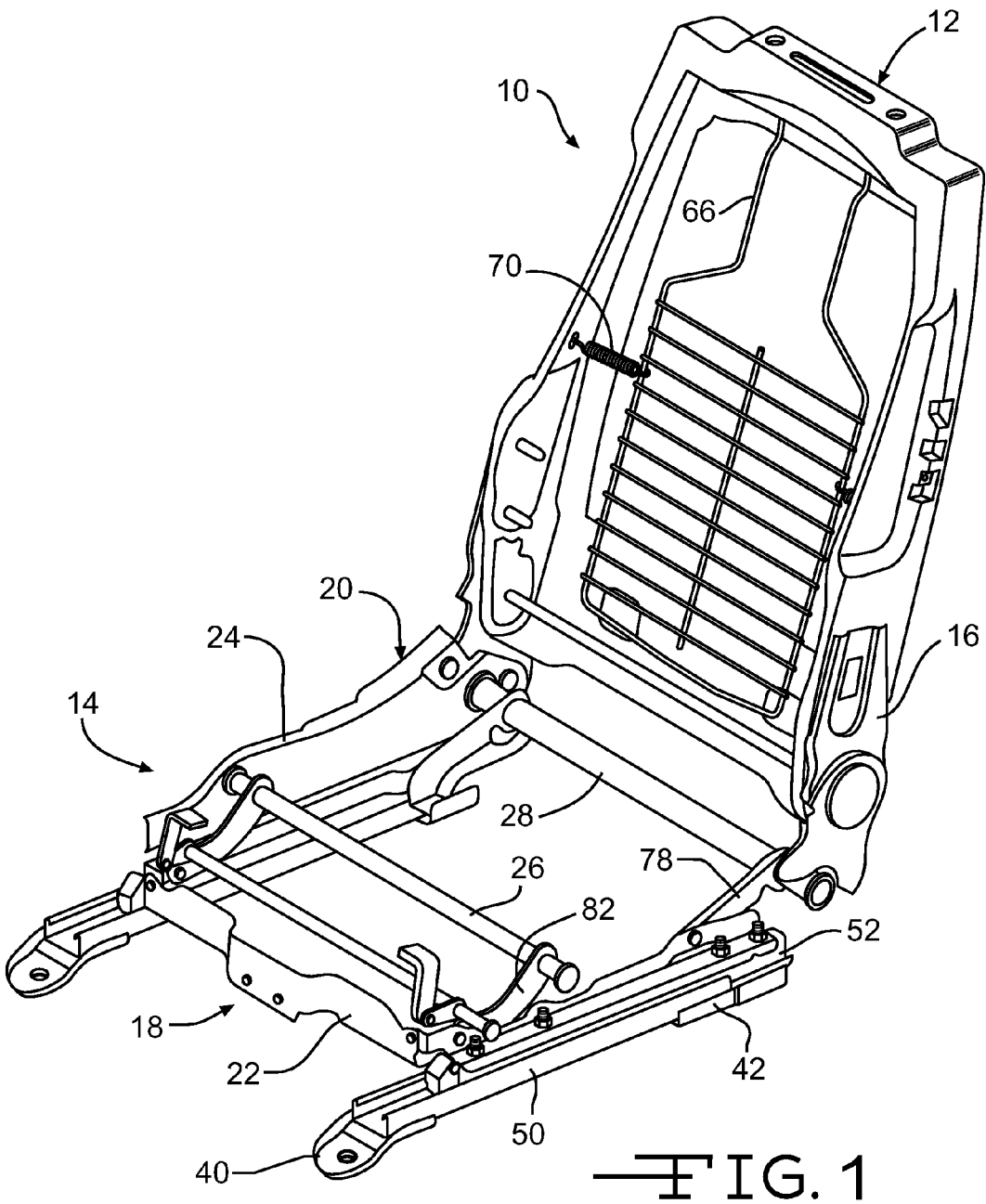
FIG. 1 is a perspective view of a portion of a vehicle seat frame.

Referring, now to the drawings, there is illustrated in FIG. 1 a vehicle seat frame, indicated generally at 10. The seat frame 10 includes a seat back frame 12 and a seat bottom frame, indicated generally at 14. To form a completed vehicle seat, the frames 12 and 14 are covered with padding and an outer trim cover layer (not shown). The seat back frame 12 is pivotally mounted to the seat bottom frame 14 via a recliner mechanism, indicated at 16, for adjusting the seat back frame 12 to a desired inclined angle relative to the seat bottom frame 14. The recliner mechanism 16 may be operated manually by a handle (not shown) or may include a motor drive unit (not shown) for electric operation.

The seat frame 10 further includes a mounting frame assembly 18 which mounts the seat bottom frame 14 to the floor of the vehicle in which the seat frame 10 is installed. As will be described below, the mounting frame assembly 18 may be configured to move the seat frame 10 in fore and aft directions, as well as in a generally vertical direction.

Figure 5:
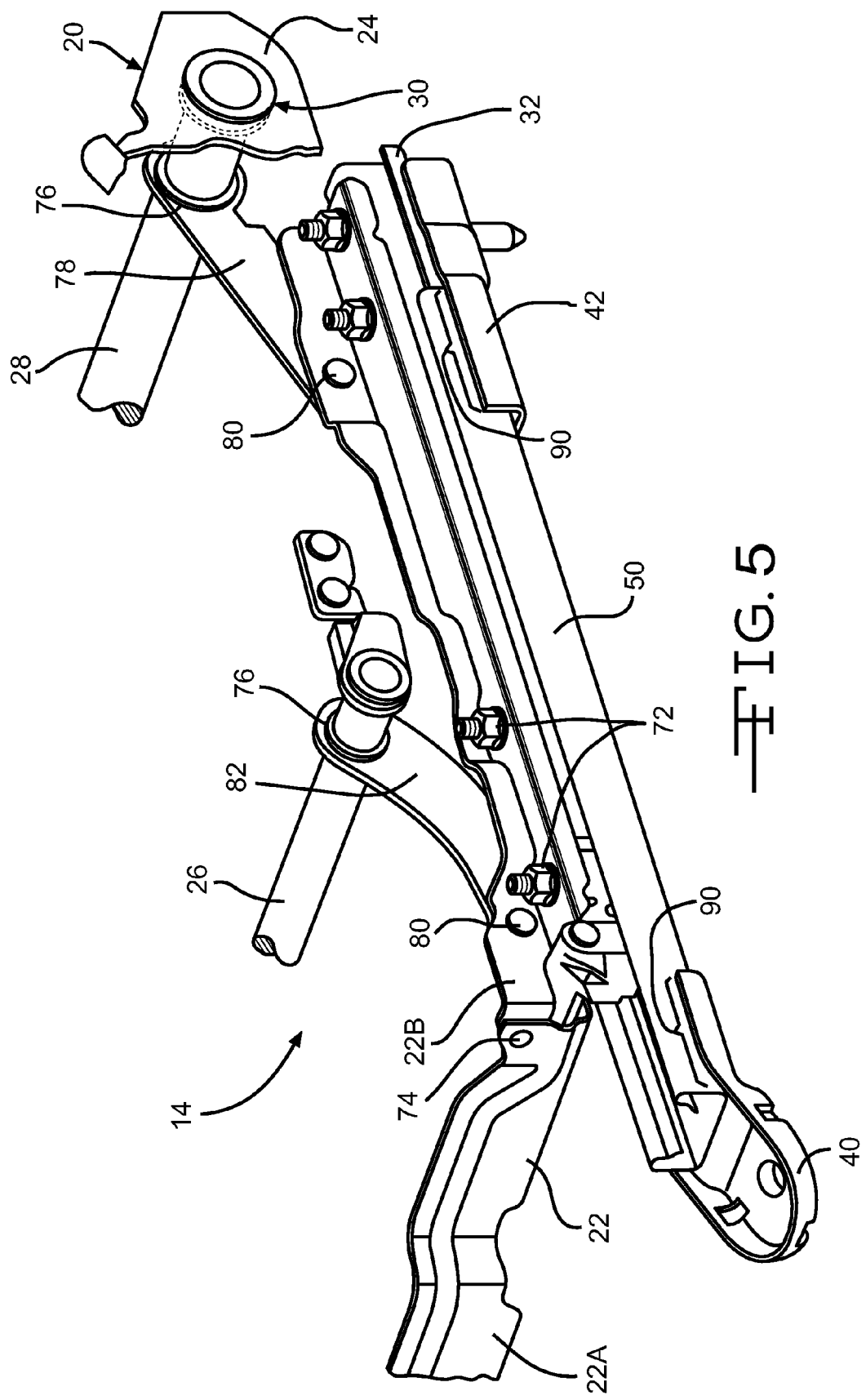
FIG. 5 is an enlarged perspective view of a portion of the vehicle seat bottom frame illustrated in FIG. 1, showing a first embodiment of a threaded fastener joint, a first embodiment of a pivoting rivet joint, and third and fourth embodiments of a structural adhesive joint.

As best shown in FIGS. 1 and 5, the seat bottom frame 14 constitutes an upper frame assembly 20 for the mounting frame assembly 18, which further includes a lower frame assembly 22. As will be discussed below, the upper frame assembly 20 is movably mounted relative to the lower frame assembly 22 for adjusting the height of the seat frame 10 relative to the floor of the vehicle. As shown in FIG. 1, the upper frame assembly 20 includes a pair of side brackets 24, only one of which is shown in FIG. 1, which extend in a fore and aft direction along the lateral sides of the seat bottom frame 14. The upper frame assembly 20 further includes a front tubular cross member or bar 26 and a rear tubular cross member 28 extending between the side brackets 24.

Figure 3:
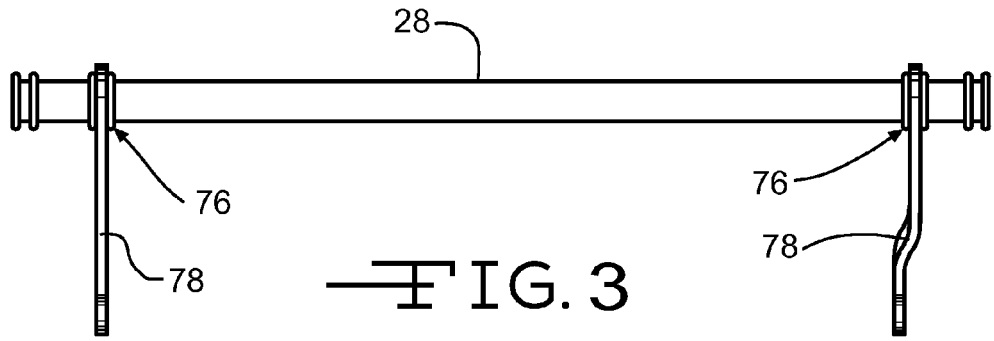
FIG. 3 is an enlarged plan view of a first embodiment of a first tubular cross member of the vehicle seat bottom frame illustrated in FIG. 1, showing a first embodiment of a fixed swaged joint.
Figure 4:
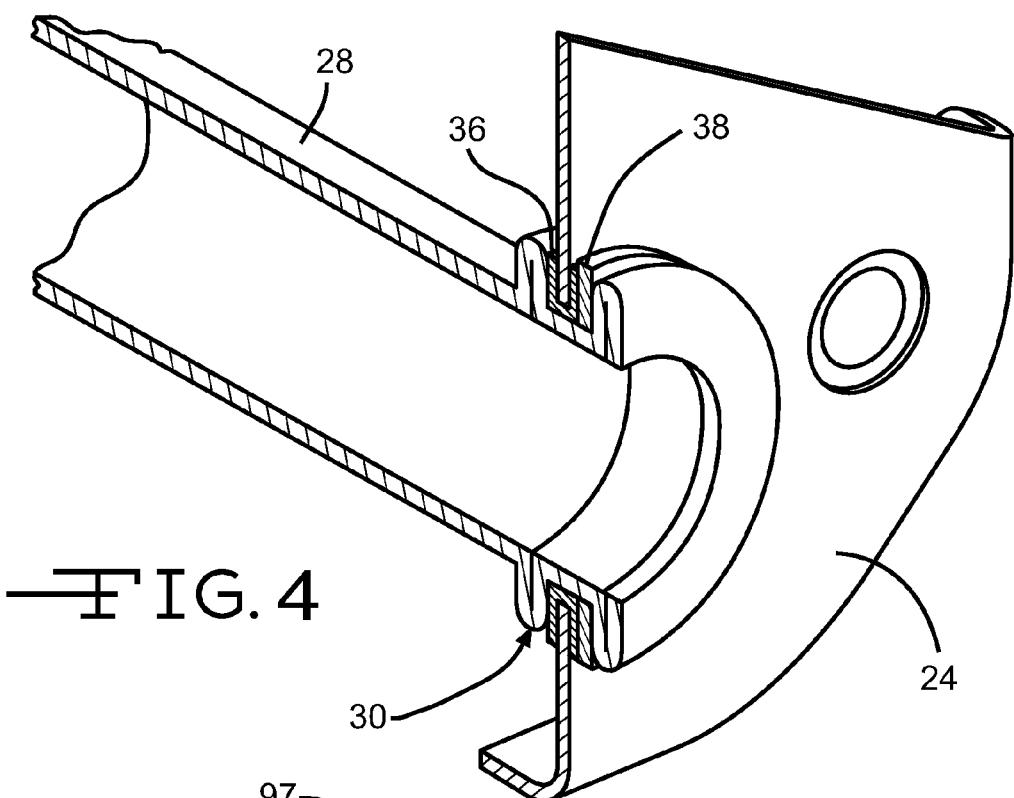
FIG. 4 is an enlarged perspective view of a first embodiment of the first tubular cross member illustrated in FIG. 3, showing a first embodiment of a swaged pivot joint.

In one embodiment, and as best shown in FIGS. 4 and 5, each end of the cross members 26 and 28 are connected to the side brackets 24 by a swaged pivot joint, indicated generally at 30 and described in detail in U.S. patent application Ser. No. 12/075,946. The swaged pivot joint 30 includes a lubricated bushing 36 and a washer 38, best shown in FIG. 4. As described therein, the pivot joints 30 permit the cross members 26 and 28 to rotate relative to the side brackets 24. In one embodiment, such as shown in FIGS. 3 and 4, the cross members 26 and 28 have a cylindrical tubular shape, thus having a hollow interior. Alternatively, the cross members 26 and 28 may have any other desired shape. The seat bottom frame 14 may further include a seat pan (not shown) and a spring wire platform (not shown) attached to the upper frame assembly 20 for generally defining the front and central portions of the seat bottom frame 14.

As shown in FIGS. 1 and 5, the mounting frame assembly 18 includes a pair of lower tracks 50 and a pair of upper tracks 52 defining a pair of track assemblies attached to the respective pair of side brackets 24. The lower tracks 50 are adapted to be rigidly connected to the vehicle floor via floor brackets 40 and 42. The upper tracks 52 are rigidly connected to the lower frame assembly 22. The upper tracks 52 are slidably mounted on the respective lower tracks 54 to provide for a fore and aft adjustment of the seat frame 10 relative to the vehicle floor. A locking mechanism (not shown) may be connected between the tracks 50 and 52 for selectable locking the upper tracks 52 relative to the lower tracks 50.

To adjust the vertical height of the seat frame 10 relative to the floor, a lifting mechanism (not shown), such as disclosed in U.S. patent application Ser. No. 12/075,946, may be used. Alternatively, any other desired lifting mechanism may be used.

It will be understood that the component parts of the seat back frame 12, and the component parts of the seat bottom frame 14, may be formed from any desirable material, such as for example, steel, aluminum, composite plastics, and any other desired metal and non-metal material. The cross members 26 and 28 can be made of any suitable material, such as steel, and other metals and non-metals.

Figure 2:
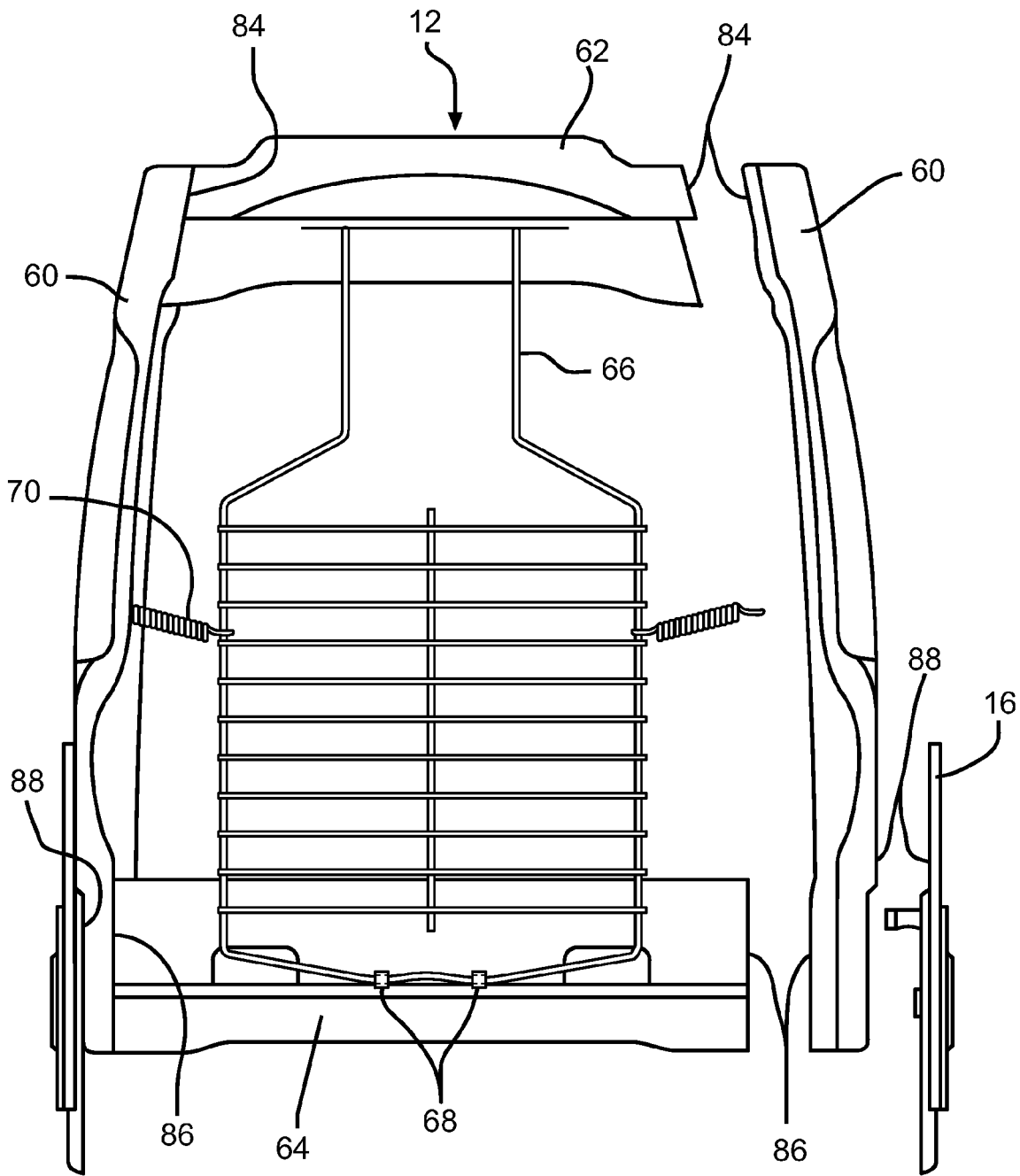
FIG. 2 is an enlarged plan view, partially exploded, of the vehicle seat back frame illustrated in FIG. 1, showing first and second embodiments of a structural adhesive joint.

The seat back frame 12 includes a plurality of frame members. The illustrated seat back frame 12 includes side members 60, an upper frame member 62, and a lower frame member 64. In the illustrated embodiment, a first end (upper end when viewing FIG. 2) of the side members 60 are connected to the upper frame member 62. A second end (lower end when viewing FIG. 2) of the side members 60 are further connected to the lower frame member 64.

The seat back frame 12 may further include a lumbar support member 66 attached to the seat back frame 12. In the illustrated embodiment, the lumbar support member 66 is attached to the lower frame member 64 with brackets 68 via snap fit connection, and to the side members 60 by springs 70. It will be understood that the lumbar support member 66 may be attached to the lower frame member 64 by any other desired method.

Advantageously, all fixed joints, defined herein as all joints wherein one of the frame components is fixedly connected to another of the frame components, may be formed by methods other than welding. By eliminating welding in the manufacture of the vehicle seat frame 10, the need for welding apparatus and associated machines, and welding operators is eliminated, and manufacturing time and cost may be reduced.

For example, structural adhesive may applied between overlapping portions of selected frame components to form a fixed joint. Examples of such fixed joints include the joint 84 between the side member 60 and the upper frame member 62, the joint 86 between the side member 60 and the lower frame member 64, the joint 88 between the side member 60 and the recliner mechanism 16, and the joint 90 between the lower track 50 and the brackets 40 and 42, as shown in FIG. 5. It will be understood that structural adhesive may be used to join any other desired combination of two or more frame components.

It will be understood that any desired structural adhesive may be used to define the fixed joints 84, 86, 88, and 90. Examples of a suitable structural adhesive include an epoxy such as Terokal® manufactured by Henkel Corporation, and other toughened adhesives, such as manufactured by Henkel Corporation.

Alternatively, threaded fasteners 72 may be used to form a second embodiment of a fixed joint. An example of such a fixed joint includes the joints between the upper track 52 and the lower frame assembly 22. Additionally, a rivet 74 may be used to form a third embodiment of a fixed joint. An example of such a fixed joint includes the joint between the components 22A and 22B of the lower frame assembly 22, as shown in FIG. 5. Further, a fixed swaged joint 76 may be used to form a fourth embodiment of a fixed joint. An example of such a fixed swaged joint 76 includes the joint between the rear cross member 28 and the pivot member 78, as shown in FIG. 3. Although the fasteners shown in the illustrated exemplary embodiments are threaded fasteners 72 and rivets 74, any other suitable fastener, such as a pin, may be used.

An additional advantage of the seat frame 10 described herein, is that all pivot joints, defined herein as all joints wherein one of the frame components is pivotally connected to another of the frame components, may be formed by methods other than welding. For example, a pivot member or lubricated rivet 80 may be used to form a first embodiment of a pivot joint. Examples of such pivot joints includes the joint between the pivot members 78 and 82 and the lower frame assembly 22, as shown in FIG. 5. The lubricated rivet 80 eliminates the need for a bushing or any other component to form the pivot joint. The rivet 80 may be coated with any desired lubrication coating, such as molybdenum dry lubricant, Teflon® fluoropolymer resin manufactured by DuPont, and the like.

Alternatively, a swaged pivot joint 30 may be used to form a second embodiment of the pivot joint. Examples of such swaged pivot joints include the joints between the rear cross member 28 and the side brackets 24, as best shown in FIG. 4.

Figure 6:
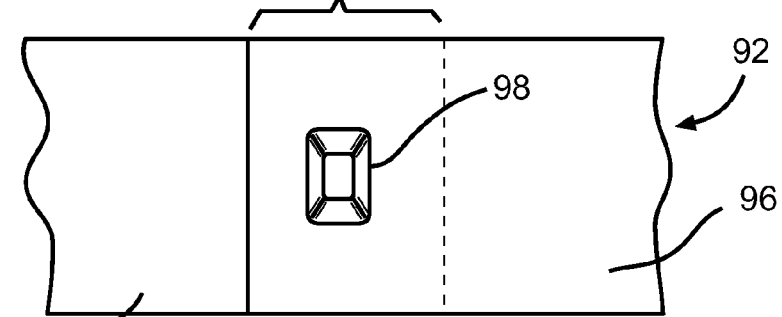
FIG. 6 is an enlarged plan view of an additional embodiment of the fixed swaged joint illustrated in FIG. 1.
Figure 7:
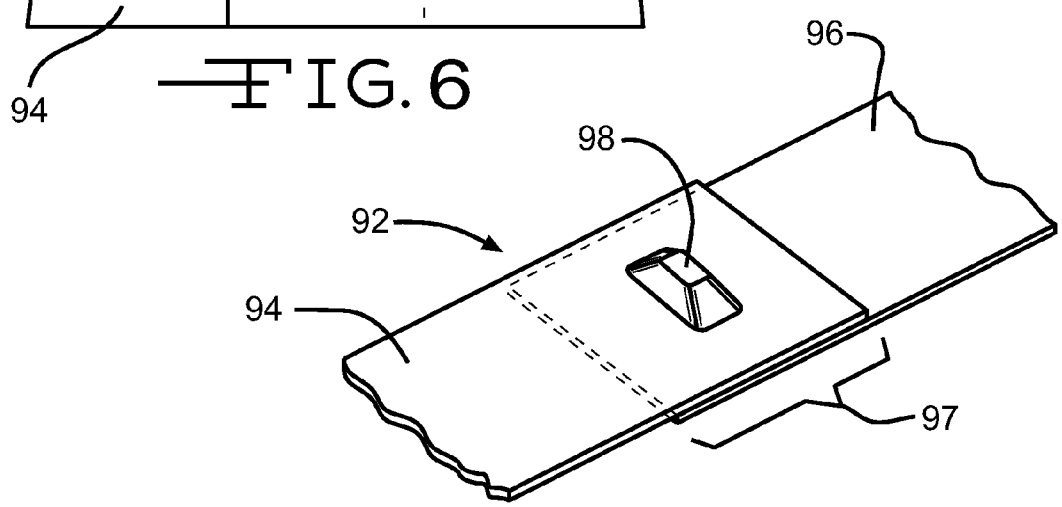
FIG. 7 is an enlarged perspective view of a reverse side of the fixed swaged joint illustrated in FIG. 6.

Referring now to FIGS. 6 and 7, there is indicated generally at 92 a second embodiment of a fixed joint. The illustrated fixed joint includes a first frame component 94 and a second frame component 96, assembled such that a portion of the first frame component 94 overlaps a portion of the second frame component 96 to define fixed joint region 97.

After the structural adhesive has been applied and the first and second frame components 94 and 96 have been assembled, a mechanical interlock feature 98 may be formed in the fixed joint region 97 to further join or interlock the first and second frame components 94 and 96 together. In the illustrated embodiment, the mechanical interlock feature 98 is a depression formed in the fixed joint region 97 of the fixed joint 92. It will be understood that the depression may be formed by any suitable stamping method.

Advantageously, the fixed joint 92 formed with structural adhesive and the mechanical interlock feature 98 will provide a reliable and rigid lap joint in any application, such as a vehicle seat frame. A further advantage of the fixed joint 92 is that the mechanical interlock feature 98 will prevent relative movement between the first and second frame components, 94 and 96, respectively, during curing of the adhesive. Additionally, the mechanical interlock feature 98 of the fixed joint 92 provides positive alignment of the first frame component 94 relative to the second frame component 96 during curing of the adhesive.

The principle and mode of operation of the vehicle seat frame have been described in its preferred embodiment. However, it should be noted that the vehicle seat frame described herein may be practiced otherwise than as specifically illustrated and described without departing from its scope.

What is claimed is:

1. A vehicle seat frame comprising:
   a seat bottom frame; and
   a seat back frame supported on the seat bottom frame, the seat back frame including an upper frame member, a first side member that is connected to the upper member at a first joint, a second side member that is connected to the upper member at a second joint, and a lower frame member that is connected to the first side member at a third joint and to the second side member at a fourth joint,
   wherein at least one of the first, second, third, and fourth joints is a fixed swaged joint; and
   wherein the seat bottom frame includes a cross member, and the first side member of the seat back frame is connected to the cross member by a swaged pivot joint.

2. The vehicle seat frame defined in claim 1 wherein more than one of the first, second, third, and fourth joints are fixed swaged joints.

3. The vehicle seat frame defined in claim 1 wherein all of the first, second, third, and fourth joints are fixed swaged joints.

4. The vehicle seat frame defined in claim 1 wherein the first side member of the seat back frame is connected to the cross member by a first swaged pivot joint, and the second side member of the seat back frame is connected to the cross member by a second swaged pivot joint.

5. A vehicle seat frame comprising:
   a seat bottom frame including a front cross member, a first side bracket that is connected to the front cross member at a first joint, a second side bracket that is connected to the front cross member at a second joint, and a rear cross member that is connected to the first side bracket at a third joint and to the second side bracket at a fourth joint; and
   a seat back frame supported on the seat bottom frame;
   wherein at least one of the first, second, third, and fourth joints is a fixed joint that is formed by a method other than welding and is selected from the group consisting of a fixed structural adhesive joint, a fixed fastener joint, and a fixed swaged joint; and
   wherein the seat back frame includes a frame member, and the rear cross member of the seat bottom frame is connected to the frame member by a swaged pivot joint.

6. The vehicle seat frame defined in claim 5 wherein more than one of the first, second, third, and fourth joints are fixed joints selected from the group consisting of a fixed structural adhesive joint, a fixed fastener joint, and a fixed swaged joint.

7. The vehicle seat frame defined in claim 5 wherein all of the first, second, third, and fourth joints are fixed joints selected from the group consisting of a fixed structural adhesive joint, a fixed fastener joint, and a fixed swaged joint.

8. The vehicle seat frame defined in claim 5 wherein the seat back frame includes first and second frame members, and the rear cross member of the seat bottom frame is connected to the first frame member by a first swaged pivot joint, and to the second frame member by a second swaged pivot joint.

9. A vehicle seat frame comprising:
   a seat bottom frame including a front cross member, a first side bracket that is connected to the front cross member at a first joint, a second side bracket that is connected to the front cross member at a second joint, and a rear cross member that is connected to the first side bracket at a third joint and to the second side bracket at a fourth joint; and
   a seat back frame supported on the seat bottom frame;
   wherein at least one of the first, second, third, and fourth joints is a fixed joint that is formed by a method other than welding and is selected from the group consisting of a fixed structural adhesive joint and a fixed fastener joint.

* * * * *